(12) United States Patent
Baarman

(10) Patent No.: US 11,936,015 B1
(45) Date of Patent: Mar. 19, 2024

(54) BATTERY EVENT MONITORING SYSTEM FOR THERMAL MANAGED BATTERY

(71) Applicant: Global Battery Solutions LLC, Holland, MI (US)

(72) Inventor: David W Baarman, Fennville, MI (US)

(73) Assignee: Global Battery Solutions LLC, Holland, MI (US)

( * ) Notice: Subject to any disclaimer, the term of this patent is extended or adjusted under 35 U.S.C. 154(b) by 0 days.

(21) Appl. No.: 18/223,578

(22) Filed: Jul. 19, 2023

(51) Int. Cl.
| | |
|---|---|
| *H01M 10/48* | (2006.01) |
| *G01K 1/14* | (2021.01) |
| *G01M 3/02* | (2006.01) |
| *H01M 50/367* | (2021.01) |
| *H01M 50/383* | (2021.01) |
| *G07C 5/00* | (2006.01) |
| *H01M 10/0525* | (2010.01) |
| *H01M 10/30* | (2006.01) |
| *H01M 10/34* | (2006.01) |

(52) U.S. Cl.
CPC ............ *H01M 10/482* (2013.01); *G01K 1/14* (2013.01); *G01M 3/02* (2013.01); *H01M 10/486* (2013.01); *H01M 50/367* (2021.01); *H01M 50/383* (2021.01); *G07C 5/008* (2013.01); *H01M 10/0525* (2013.01); *H01M 10/30* (2013.01); *H01M 10/345* (2013.01); *H01M 2220/20* (2013.01)

(58) Field of Classification Search
CPC ............ H01M 10/482; H01M 10/486; H01M 50/367; H01M 50/383; H01M 10/0525; H01M 10/30; H01M 10/345; H01M 2220/20; G01K 1/14; G01M 3/02; G07C 5/008

See application file for complete search history.

(56) References Cited

U.S. PATENT DOCUMENTS

| | | | |
|---|---|---|---|
| 6,611,774 B1 * | 8/2003 | Zaccaria ............... | H01M 10/46 702/65 |
| 10,147,921 B2 | 12/2018 | Knowles et al. | |
| 11,018,397 B2 | 5/2021 | Knowles et al. | |
| 2011/0111269 A1 * | 5/2011 | Tse ......................... | B60K 28/14 429/50 |
| 2013/0166119 A1 * | 6/2013 | Kummer ................. | B60L 1/02 701/22 |
| 2018/0058769 A1 * | 3/2018 | Bidner ..................... | F28F 27/00 |
| 2023/0187773 A1 * | 6/2023 | Maresch ............. | H01M 50/204 429/56 |

* cited by examiner

*Primary Examiner* — Behrang Badii
(74) *Attorney, Agent, or Firm* — Warner Norcross + Judd LLP

(57) ABSTRACT

The present invention provides a system and method for determining when a battery, or one or more batteries within a battery pack, undergoes an undesired thermal event such as thermal runaway. A sensor pack is mounted in close proximity to, or in contact with, an external surface of the battery or batteries to be monitored and communicates battery information, including battery compartment information, to a battery package monitor outside the battery compartment. Cloud connectivity can be provided via a mobile application to a battery thermal management package.

16 Claims, 5 Drawing Sheets

BATTERY EVENT MONITORING SYSTEM FOR THERMAL MANAGED BATTERY

BACKGROUND OF THE INVENTION

The present invention relates to systems and methods for monitoring batteries, such as battery thermal events.

There are a number of different types of known battery monitoring solutions. In general, a battery monitor typically monitors and displays one or more characteristics of a battery being monitored on a user interface. For example, some typically monitored characteristics can include the percent of battery capacity remaining, battery voltage, net amperage going in/out of the battery, estimated remaining runtime, power consumption, and battery temperature. Known battery monitoring solutions range from simple battery monitors and idiot lights that monitor one or two characteristics to more sophisticated battery monitoring equipment that monitors a large number of different characteristics.

Lithium-Ion cells and other rechargeable batteries can have a small chance of spontaneously shorting, which causes the battery interior to heat gradually to about 130° C. where the separator film melts. That, in turn, can trigger an explosive release of electric energy, where the battery end cap ruptures, a flare emerges briefly, and then for a minute or so the cell materials combust, releasing heat and gases, and driving the cell to temperatures greater than 500° C. Neighboring cells can be heated above a critical temperature (e.g., 130° C.) where they also short with the same consequences, generally referred to as thermal runaway propagation or a thermal runaway event. Some batteries have special packaging to assist in containing and/or mitigating these types of thermal events.

Battery protection systems, such as thermal runaway protection systems, can interfere with traditional battery monitoring solutions. That is, known battery monitors and battery monitor connection methods are not generally conducive to tracking characteristics and events related to thermal battery events, especially where batteries are packaged to contain/mitigate thermal events. Known battery monitor solutions are generally not designed for ease of configuration and versatility of use. Further, while some known battery systems may be capable of monitoring battery temperature for some batteries, there is a need for suitable battery monitoring solutions that can provide more advanced monitoring, especially where the battery is disposed within a battery thermal management package.

There are a number of emerging technologies that are making strides in reducing thermal runaway events. For example, the Kulr Thermal Runaway Shield described in U.S. Pat. No. 11,018,397 is one such technology that aims to reduce thermal runaway risk by insulating the battery terminals using a specifically designed battery thermal management package. However, despite these improvements, thermal runaway events have not been eliminated in their entirety. Accordingly, systems and methods for detecting thermal runaway events, or their precursor, can provide time to eliminate, or at least mitigate, damage to adjacent cells and materials.

SUMMARY OF THE INVENTION

The present disclosure provides a battery event tracker and management system. One embodiment of the system includes the system includes a rechargeable battery (e.g., a lithium-ion (Li-ion) battery, a nickel-cadmium (NiCad) battery, or a nickel-metal hydride (NiMH) battery), a battery thermal management package, a battery package monitor, and a second pack. The battery thermal management package has a battery compartment that contains a thermal events of the rechargeable battery. It also includes a holder joined to a surface of the battery thermal management package outside the battery compartment of the battery thermal management package. The holder selectively holds the battery package monitor outside of the battery compartment. The sensor pack is contained within the battery compartment and configured to sense one or more battery characteristics while the rechargeable battery is contained within the battery compartment of the battery thermal management package. The sensor pack also communicates the battery characteristics to a battery package monitor held outside of the battery compartment of the battery thermal management package by the battery thermal management package holder.

In some embodiments, the sensor pack is configured to sense a battery gas leak from the rechargeable battery within the battery compartment of the battery thermal management package. In other embodiments, the sensor pack is configured to sense pressure within the battery compartment of the battery thermal management package. In yet other embodiments, the sensor pack is configured to sense temperature within the battery compartment. The battery package monitor can be configured to sense a thermal runaway precursor event based on information from the sensor pack and communicate an alert to a remote device.

The battery package monitor can be configured for direct or wireless communication with the sensor pack within the battery compartment through the battery compartment of the battery thermal management package. For direct communication, a wire can be routed through a sealed pin-through hole in the battery compartment of the battery thermal management package.

The system can include one or more remote monitor interfaces that communicate with the battery package monitor. The remote monitor interfaces can include smartphones or a vehicle monitor interface installed or disposed in the cabin of a vehicle. The remote monitor interface can provide filter life and readiness information based on information from the battery package monitor.

A vehicle monitor interface can be disposed within a cabin area of a vehicle and the battery thermal management package can be disposed within a cargo area of the vehicle. The vehicle monitor interface can include an environmental safety indicator configured to indicate environmental safety status within the cargo area based on information from the battery package monitor.

The system can include a gas mitigation system that includes its own battery or other power source, one or more gas sensors, a fan controller, a fan, a filtration system, and a communication interface. Vehicle power can power the gas mitigation system.

The battery thermal management package can include a tortured path from the battery compartment to a gas outlet. The battery thermal managed package can include a filter at the outlet of the battery thermal management package.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, ZS and Y, Z.

DESCRIPTION OF THE CURRENT EMBODIMENT

Figure 1:
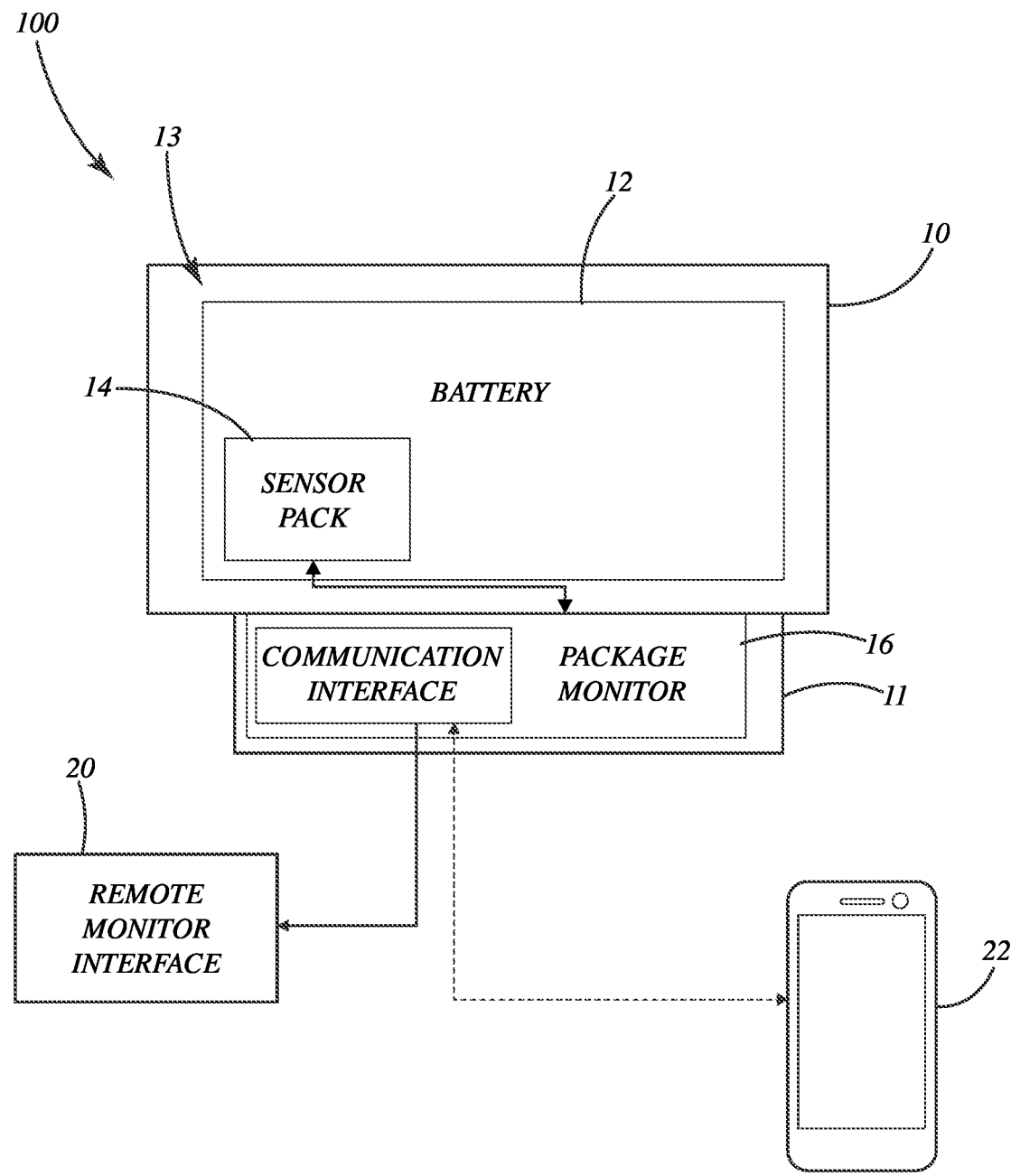
FIG. 1 illustrates a representative schematic of a battery event monitoring system for a thermal managed battery in accordance with an embodiment of the present disclosure.

The present disclosure provides a battery event monitoring system for a thermal managed battery. FIG. 1 illustrates a representative schematic view of a battery event monitoring system 100 in accordance with one embodiment of the present disclosure. The battery event monitoring system 100 can monitor a rechargeable battery 12 disposed within a battery compartment 13 of a battery thermal management package 10. A sensor pack 14 co-located with the rechargeable battery 12 within the battery compartment 13 of the battery thermal management package 10 communicates sensor information (e.g., in real-time or near-real time) from within the battery compartment 13 to a battery package monitor 16 located outside the battery compartment 13. The battery package monitor 16 can be held by a holder 11 of the battery thermal management package 10, such as a battery monitor pocket joined to an external surface of the battery thermal management package 10. That is, the battery thermal management package can have an exterior pocket (e.g., a pouch) for monitoring electronics (e.g., monitoring the sensor pack in the battery compartment) and an interior securing device for securing the sensor pack within the battery compartment (e.g., hook and loop fasteners). Accessibility to facilitate ease of removal, replacement, and/or operational verification for both the sensor pack in the battery compartment and the battery package monitor outside the battery compartment can be valuable. Both components may need to be removed and replaced in different scenarios. In some embodiments, this can be accomplished with a Velcro closed pocket on the outside of the enclosure that holds the battery package monitor where the enclosure has a wireway allowing the battery package monitor to connect to the sensor pack via wires or other electrical connectors. The wireway through the enclosure can be fully or partially sealed. The wireway can be configured to provide a direct electrical battery interface (e.g., with indirect wire connection to the sensor pack or via direct wire connection to the sensor pack and the battery, or in an embodiment without an integrated sensor pack via direct wire connection to the battery having an integrated sensor) without invalidating the integrity of the battery thermal management package.

In essence, there are at least four types of embodiments: 1) a battery package monitor disposed in a pocket outside the enclosure with wires that are routed through the battery monitor package to the sensor pack, which is directly connected to the battery by wire or other electrical contacts; 2) the monitor is disposed in the pocket and communicates wirelessly to the sensor pack in the battery compartment, because the communication is wireless there are no wireways through the enclosure; 3) monitor stored in the pocket outside the enclosure with wires that go through the enclosure directly to the battery and the battery has an integrated sensor system that acts as a sensor pack; and 4) monitor stored in the pocket outside with two sets of wires through a wireway of the enclosure, one set of wires routed to the sensor pack and one set of wires routed directly to an integrated sensor pack on the battery—this configuration can provide sensor redundancy where the sensor pack and integrated sensor pack on the battery share sensors and/or can provide additional sensor diversity where the sensor pack or integrated sensor pack have different sensors than one another.

One advantage of the battery package monitor 16 being disposed outside the battery compartment 13 and in communication with the sensor pack 14 in the battery compartment 13 is that information regarding the status of the battery 12 (including individual battery cells) and the battery compartment (e.g., temperature level, pressure level, and volume of gas within the battery compartment) can be safely monitored without having physical access to the battery compartment 13. Further, because information from the battery package monitor 16 can be further communicated to a remote device (e.g., a smartphone or a remote battery monitor interface), information regarding the battery, the battery thermal management package 10, and its surroundings (e.g., a cargo area of a vehicle during transportation, a storage area within a warehouse, or another area where the battery thermal management package is being stored) can be safely monitored not only without physically accessing the battery compartment 13 of the battery thermal management package 10, but without physically accessing the environment where the battery thermal management package is being stored (e.g., the cargo area, storage area, or other type of surrounding area where the battery thermal management package is located).

During a thermal runaway event (or precursor event) a battery cell can release a variety of different gases such as carbon dioxide, hydrogen, carbon monoxide, and hydrogen fluoride, which can be flammable and hazardous. Sensors within a sensor pack n the battery compartment can detect trace amounts of these gases as they are released into the battery compartment. Some battery thermal management packages can leverage early detection to help prevent thermal runaway, for example by venting or channeling the gases out of the battery compartment. Other thermal management packages have passive solutions that help reduce the impact of or prevent thermal runaway events from cascading. That is, one of the dangers during battery cell failure is that as one cell fails it releases high temperature particles and gases that cause other, typically adjacent cells, to also fail potentially creating a cascading thermal runaway event for the entire battery.

Conventional thermal management packages lack a local communication link to a battery package monitor disposed outside the battery compartment of the thermal management package, as provided by embodiments of the present disclosure. The communication link (or lack thereof) between the sensor pack 14 and the battery package monitor 16 (and any downstream remote device(s)) can provide warning of a precursor, ongoing, or completed thermal runaway event and allow suitable precautions to be taken by users and/or clean-up personnel. Even where a thermal runaway event (e.g., precursor, ongoing, or completed) disrupts communication between the sensor pack 14 and the battery package monitor 16, the battery package monitor 16 can indicate the break in the communication link (and associated timestamp) from the sensor pack 14 and alert downstream devices (and users of those devices) of potential battery thermal events (runaway or otherwise) that may have caused the disruption in communication.

The battery package monitor 16 can provide battery information (e.g., real-time or near real-time battery information) to a remote device. This information can inform safety decisions. For example, the battery information can be utilized to trigger an alert on a user interface letting a user know that: a cargo area of a vehicle where the battery thermal management package is disposed is unsafe to access, a filter of the battery thermal management package is at or near end of life, specific information about a thermal runaway event and status thereof, or other battery information, such as location information, identifier (ID) information (e.g., RFID tag ID), or battery thermal management package information.

The battery event monitoring system 100 can collect and store battery information to generate a history of battery information (e.g., battery safety information and/or battery performance information). This historic battery information can be helpful to track both: sensor output over a relatively short amount of time (e.g., the 20-30 seconds leading up to and during a battery thermal event) and sensor output over a longer amount of time (e.g., during transportation from a departure point to a destination). This historic information can be utilized to identify thermal runaway events (or precursors) and inform battery safety decisions. By tracking information over time, one embodiment of the present disclosure can track the trajectory and rates of various battery events to provide an improved battery safety support system and to provide information regarding battery status. Such tracking can be informative at critical moments to a user and can be highly beneficial and easy to maintain over the battery life.

Figure 3:
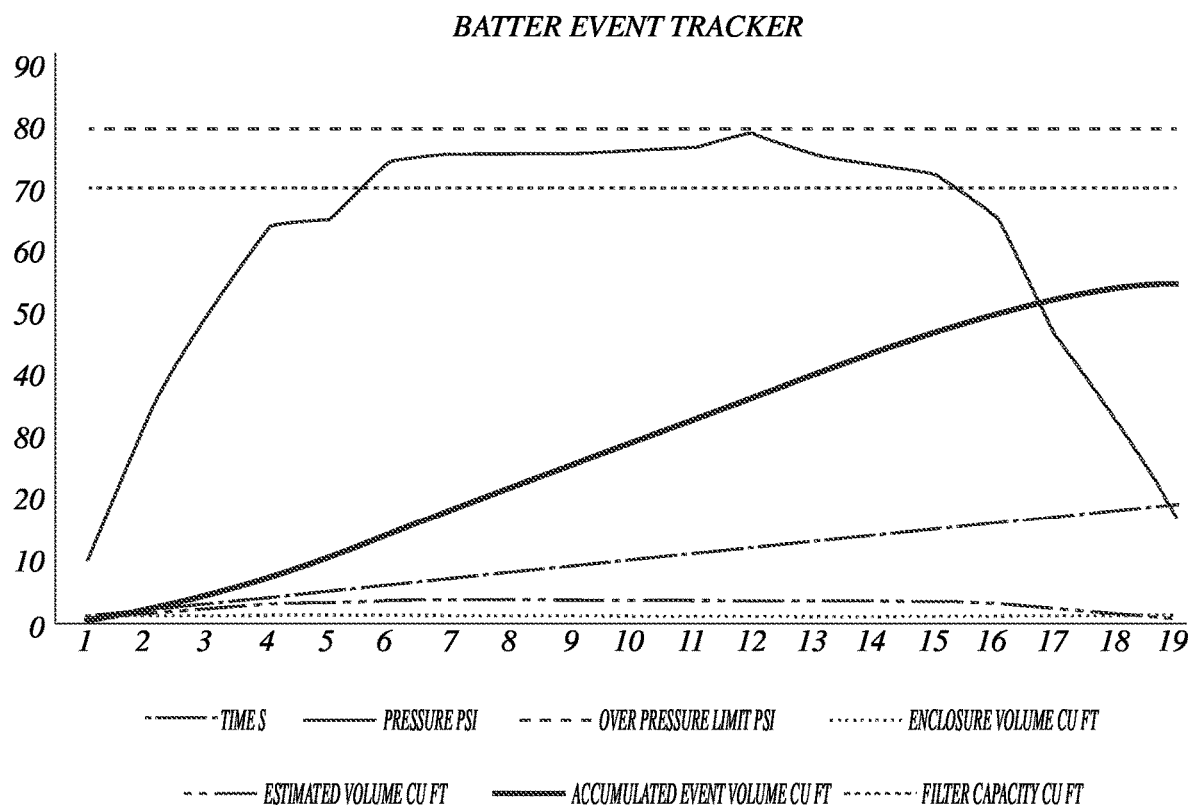
FIG. 3 illustrates a graph of battery compartment characteristics over time collected by an embodiment of a battery event monitoring system for a thermal managed battery of the present disclosure.
Figure 4:
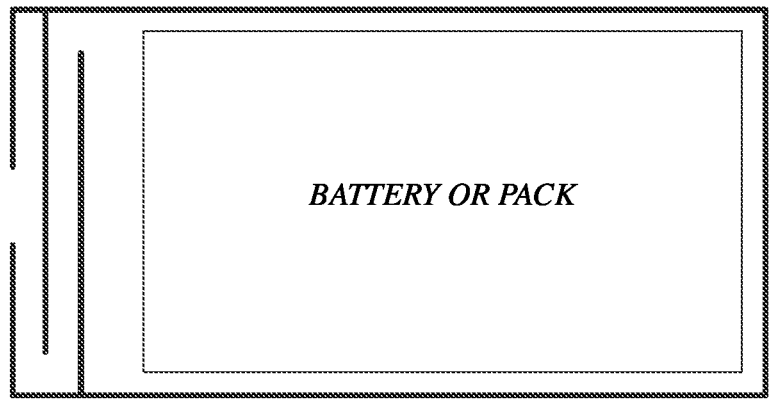
FIG. 4 illustrates a thermal managed battery package with a gas outlet for use with an embodiment of the battery event monitoring system of the present disclosure.
Figure 5:
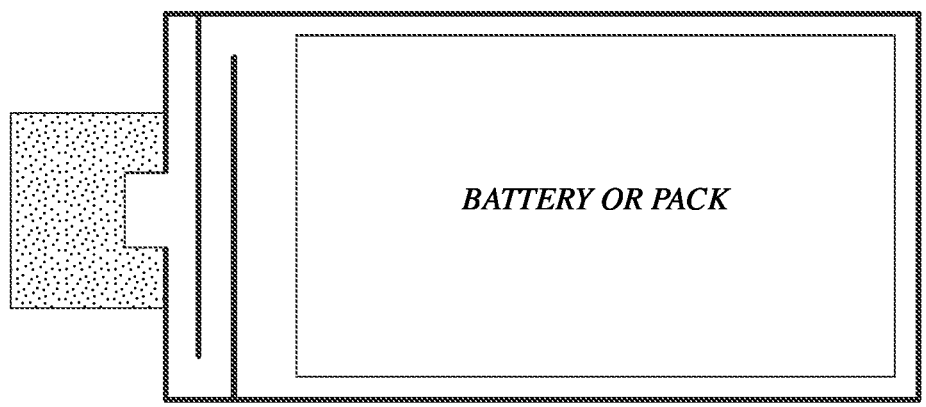
FIG. 5 illustrates a thermal managed battery package with a gas outlet and filter for use with an embodiment of the battery event monitoring system of the present disclosure.

By way of example, FIG. 3 illustrates a graph of several battery characteristics over a period of about 20 seconds during a battery thermal event. Specifically, it shows exemplary battery information collected during a non-runaway battery thermal event. The battery event monitoring system in accordance with the present disclosure can collect information before, during, and after thermal events. In the FIG. 3 exemplary instance, the battery thermal event did not escalate to a thermal runway event. The changes in battery package enclosure pressure levels (PSI) and temperature (C) can be sensed and tracked over time. These values can be used with other known data, such as enclosure volume (cu ft) and filter capacity (e.g., a particular volume in cu ft) to determine characteristics about the event. For example, estimated volume (cu ft) and accumulated event volume (cu ft) over the duration of the thermal event can be derived from sensor data. Temperature is not shown on the graph of FIG. 3, but temperature values are included in Table 1, referenced below.

This battery event information (sensed and/or derived) can be automatically (or semi-automatically) analyzed by a local or remote battery management system (e.g., a controller in the battery package monitor 16, 216, remote monitor interface 20, 222, smartphone 22, gas mitigation system 220, or another (e.g., dedicated) controller in the system) to provide insights regarding the battery and/or battery thermal management package. The temperature in the battery compartment can also be measured and utilized in the analysis (Celsius/Fahrenheit).

The enclosure pressure levels refer to the pressure inside of the battery package enclosure, the estimated volume refers to the sensor pack's live estimate of volume in the battery package enclosure, the enclosure volume refers to the original or starting battery package enclosure volume, and the accumulated event volume refers to the total amount of gas volume moved through the filter. The time shown in the graph is the accumulated time. The accumulated time at a given pressure can be helpful in determining the accumulated volume assuming an event is taking place—accounting for temperature and pressure. The filter loading or filter capacity refers to the filter rating for one or more chemistries. For example, the filter capacity can refer to the amount of absorption of a chemical a filter can undergo until it reaches capacity and begins to bleed through the filter or otherwise stop working as intended. Filters can have different filter capacities/loading for different chemicals. That is, the system can include one or more filters depending on the battery chemistry of the battery and the particular gases that may be being filtered by the filter.

The battery management system can evaluate the sensor output to provide various insights such as, for example: whether the battery and/or battery thermal management package needs repair or replacement; whether and/or when it will be safe to access the environment where the battery thermal management package; whether and/or when it will be safe to access the battery compartment of the battery thermal management package; and/or whether the filter should be replaced (e.g., the system can track filter life against its rated capacity based on the sensor output values).

These insights can be reached by comparing the sensor output to labeled patterns of sensor output. By determining the size of an event, the filter capacity/status or the ventilation status and time to vent the system can estimate the safety and timing metrics for a given situation (e.g., probability of a particular battery event (such as a runaway thermal event), intensity of a battery event, time until a particular battery event). Additionally, gas sensors can measure the concentration of gas externally from the enclosure, which can be utilized in determination of safety level. Referring to FIG. 3, during an initial time period, about 5-6 seconds, the pressure level within the battery compartment beings to rise from about 10 PSI to close to 75 PSI. This quick rise in pressure over just a few seconds is a good indicator of a precursor event to a potential thermal runaway event. In this instance the over-pressure limit is not reached and therefore the system knows that no over-pressure release was performed and therefore there was no outgassing from the battery compartment. In some embodiments, this can be sufficient to trigger an alarm or a change in a status indicator. That is, the battery package monitor can have an indicator system (e.g., light, sound, or other indicator) that can warn of a potential battery thermal event (runaway or otherwise). In addition, the battery package monitor can communicate this information to one or more remote devices, such as a smartphone or a remote monitoring interface (e.g., a vehicle interface installed in the cabin of a vehicle transporting the battery being monitored). In turn, these devices can alert their respective users of the battery thermal event. If the over-pressure limit was reached, then the over-pressure release would automatically outgas from the battery compartment and the system can alert the user (e.g., via communication to a remote monitor interface) that the environment outside the battery thermal management package may be potentially unsafe based on the amount of outgassing to maintain a safe pressure level in the battery compartment.

Table 1, below, provides exemplary temperature data during a battery thermal event in addition to the data utilized to generate the FIG. 3 graph.

pressure/volumes of certain gases) different countermeasures can be taken and different urgency levels for replacing the filter and/or the battery thermal management package can be indicated to the user.

Depending on the application, the battery event monitoring system can utilize a plurality of different battery monitoring methods using a variety of different types of sensors. The battery event monitoring system 100 can include sensors within the battery compartment 13 of the battery thermal management package 10 (e.g., sensor pack 14) as well as sensors outside the battery compartment of the battery thermal management package 10 (e.g., sensors can be included in the battery package monitor 16 and/or the gas mitigation system 220 (if included)).

The battery event monitoring system can leverage information within the battery compartment to provide event tracking. The event tracking can assist in determining the quality of the battery data gathered and the resolution or quality of the data represented with or with a transportation package. That is, in conventional systems, typically battery data is only monitored when the battery is in the vehicle or under use. The extension of that data provides a much better picture of what is happening during transportation i.e., shock, movement, temperatures and battery anomalies.

The battery event monitoring system 100 of the present disclosure can track battery thermal events within a controlled package, e.g., a battery thermal management package 10. The battery package monitor 16 includes electronics to

TABLE 1

| Time S | Temp C. | Pressure PSI | Over pressure limit PSI | Enclosure volume cu/ft | Estimated volume cu/ft | Accumulated Event Volume | Filter Capacity |
|---|---|---|---|---|---|---|---|
| 1 | 21.1 | 10.0 | 80 | 1.2 | 0.5 | 0.5 | 70 |
| 2 | 111.1 | 33.1 | 80 | 1.2 | 1.6 | 2.1 | 70 |
| 3 | 176.7 | 50.0 | 80 | 1.2 | 2.4 | 4.5 | 70 |
| 4 | 232.2 | 64.3 | 80 | 1.2 | 3.1 | 7.6 | 70 |
| 5 | 236.1 | 65.3 | 80 | 1.2 | 3.1 | 10.7 | 70 |
| 6 | 272.8 | 74.7 | 80 | 1.2 | 3.6 | 14.3 | 70 |
| 7 | 277.8 | 76.0 | 80 | 1.2 | 3.6 | 17.9 | 70 |
| 8 | 278.3 | 76.1 | 80 | 1.2 | 3.7 | 21.6 | 70 |
| 9 | 278.3 | 76.1 | 80 | 1.2 | 3.7 | 25.2 | 70 |
| 10 | 280.6 | 76.7 | 80 | 1.2 | 3.7 | 28.9 | 70 |
| 11 | 282.2 | 77.1 | 80 | 1.2 | 3.7 | 32.6 | 70 |
| 12 | 290.6 | 79.3 | 80 | 1.2 | 3.8 | 36.4 | 70 |
| 13 | 277.8 | 76.0 | 80 | 1.2 | 3.6 | 40.1 | 70 |
| 14 | 271.7 | 74.4 | 80 | 1.2 | 3.6 | 43.6 | 70 |
| 15 | 265.6 | 72.9 | 80 | 1.2 | 3.5 | 47.1 | 70 |
| 16 | 237.8 | 65.7 | 80 | 1.2 | 3.2 | 50.3 | 70 |
| 17 | 160.6 | 45.9 | 80 | 1.2 | 2.2 | 52.5 | 70 |
| 18 | 110.6 | 33.0 | 80 | 1.2 | 1.6 | 54.1 | 70 |
| 19 | 48.9 | 17.1 | 80 | 1.2 | 0.8 | 54.9 | 70 |

Some embodiments of the present disclosure can include a filter, such as a hydrogen fluoride filter. A hydrogen fluoride filter can filter gas as it pressurizes the package and exits the battery compartment. During a thermal event, gases can escape from the battery into the battery compartment, which can cause a rise in enclosure volume seen by sensors in the sensor pack 14. Some thermal management systems provide filters and/or the ability to vent gases, such as hydro fluoride, that can help to mitigate the possibility of a battery thermal event becoming a thermal runaway event. The filter in the FIG. 3 example did its job. However, the system may not be able to withstand another thermal event. The user can be alerted (e.g., via a remote monitor interface) to change the filter and/or move the battery to a new thermal battery monitor package. Depending on the severity of the thermal event (e.g., whether certain thresholds for temperature/ track, manage, and communicate battery events. The battery monitor watches the battery voltages and temperatures but additional data such as accelerometer data, package pressure data, gas sensor data, C02 data, VOC data from other sensors can also be utilized. This data can be used to play back the event and assist in analyzing the chain of events and outcomes. The sensor pack can have its own power source, microprocessor, non-volatile memory and transceiver to provide remote monitoring as to assure the complete event is tracked. The monitor 16 can communicate with devices directly or wirelessly (e.g., radio frequency communication such as WiFi and/or Bluetooth) connected.

The battery package monitor 16 can be selectively disposed in a holder 11 of the battery thermal management package. In one embodiment, the holder 11 is a pocket or pouch joined (e.g., sewn or otherwise fastened) to the outside wall of a battery thermal management package. In alternative embodiments, the holder 11 can be provided by corresponding hook and loop fasteners joined to respective surfaces of the battery thermal management package 10 and the battery package monitor 16. The battery package monitor 16 can communicate with the sensor pack 14 located in proximity to the battery 12 being stored in the battery compartment 13 while the battery package monitor 16 is located outside of the battery compartment 13 of the battery thermal management package 10. Temperature and pressure levels can be monitored and stored in memory within the battery package monitor 16, allowing for battery information to be collected and stored for tracking essentially any and all battery thermal events.

The battery thermal management package 10 may also be referred to as a thermal runaway shield enclosure. The package 10 can be configured to contain a thermal incident of a rechargeable battery, such as a lithium-ion (Li-ion) battery, a nickel-cadmium (NiCad) battery, a nickel-metal hydride (NiMH) battery, or another type of rechargeable battery. One example of a thermal runaway shield enclosure is detailed in U.S. Pat. No. 11,018,397 to Knowles (owned by Kulr), which was filed on Apr. 9, 2018, entitled "Thermal Runaway Shield," and is hereby incorporated by reference in its entirety. The battery thermal management package 10 can be essentially any type of thermal event management package, but in the current embodiment it is a Kulr non-ejection thermal event management package as commercially available from Kulr and described in the Knowles patent.

The package 10 can be a rigid case with openings to afford expansion gases an avenue to vent during a thermal incident. The interior of the package can be lined with a permeable fabric that is strong, heat resistant and able to contain debris and gases from a thermal incident. For example, the permeable fabric can be Nomex, Kevlar, or other heat resistant material that permits controlled release of gas from any thermal event. That is, the package affords controlled release of gas but contains flame and ejecta that can be generated in a thermal runaway event.

The package 10 can be a closable bag with a sealable opening (e.g., by folding or use of a fastener). For example, Velcro or another suitable sealing mechanism can seal the bag. Once sealed, the bag can be further wrapped to form a wrapped package substantially shaped and larger than the unwrapped energy cells as the energy cells are now wrapped in the thermal runway shield bag and associated liners, if utilized. Slits can be located on the sides of the bag to further enhance the permeability of the bag during a thermal runaway event. The slits can be fabricated from high temperature fiberglass material or other suitable material capable of withstanding high temperatures.

Referring back to FIG. 1, the battery event monitoring system 100 can be installed and managed through the assistance of a mobile or cloud managed application. For example, a smartphone 22 can communicate with the battery package monitor 16 to facilitate a guided setup. The application can guide the user through identifying battery 12 type, battery package 10 type, filter (if utilized) type, battery sensor pack 14, and other components of the system. This process can include identifying specific part numbers and/or characteristics (e.g., filter capacity) for data accuracy.

Once configured, the battery package monitor 16 can connect (wired or wirelessly) to the sensor package 14 to track battery events and status of the battery compartment 13. Events that age the filter(s) can be tracked and maintained to assist the user with replacing the filter(s) at the right time. Further, the sensors can track which gases the filter(s) have been subjected to and the thermal activity and pressure activity within the package, which can affect filter life and other characteristics of the system 100.

A mobile battery monitor interface (e.g., available through a smartphone app) can allow battery information to be pulled (e.g., downloaded) from a battery package monitor 16 and pushed (e.g., uploaded) to a cloud server for statistical analysis and cloud monitoring.

Figure 2:
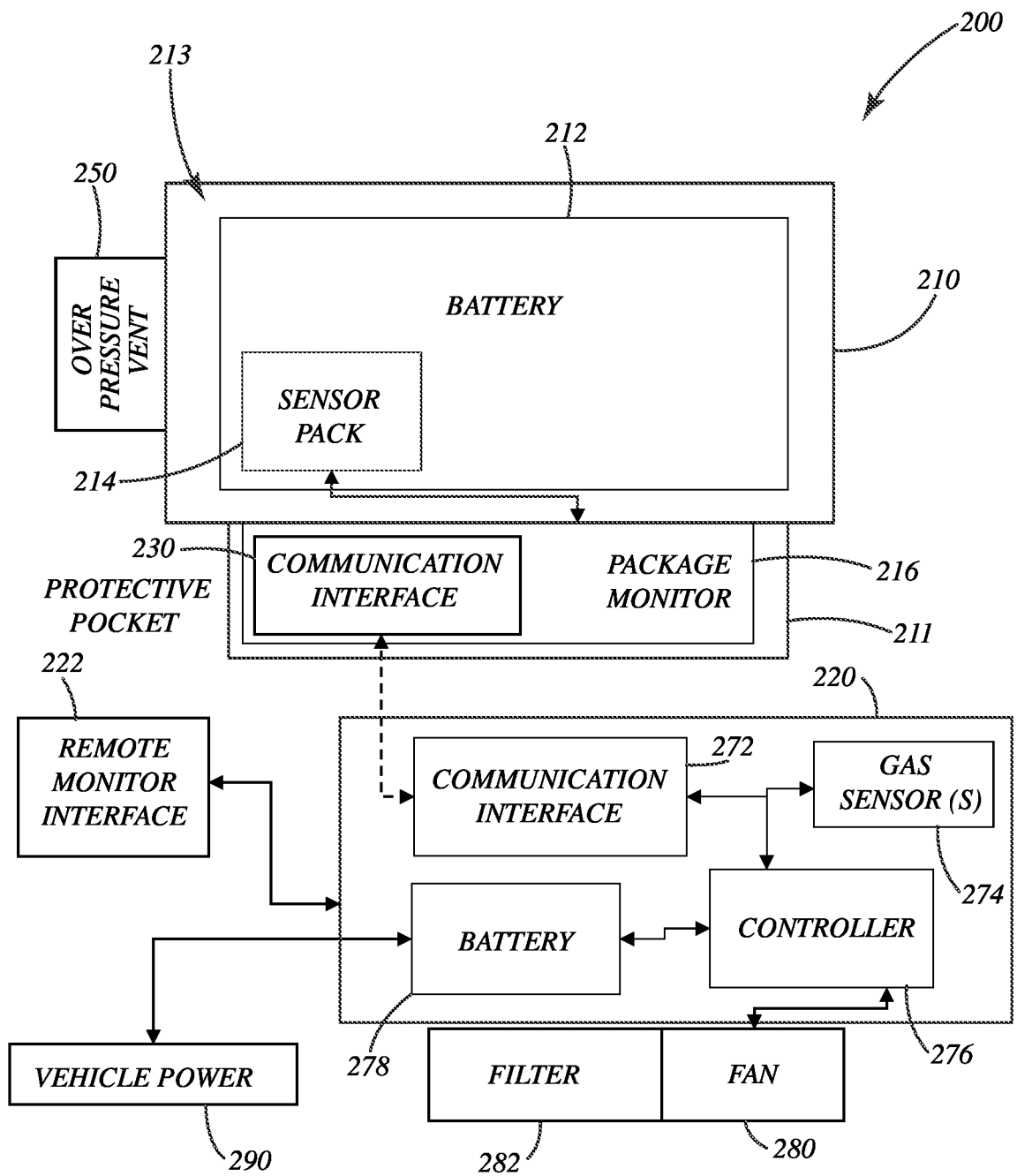
FIG. 2 illustrates a representative schematic of a battery event monitoring system for a thermal managed battery in accordance with another embodiment of the present disclosure.

FIG. 2 shows a representative schematic view of a battery event monitoring system 200 for monitoring a rechargeable battery 212 disposed within a battery compartment 213 of a battery thermal management package 210. This system may incorporate typical networking or Mesh technology to assure a more robust communications scheme. This can be utilizing a BTLE transceiver, LoRa transceiver of WiFi transceiver. A sensor pack 214 co-located with the rechargeable battery 212 within the battery compartment 213 of the battery thermal management package 210 can communicate sensor information in real-time from within the battery compartment 213 to a battery package monitor 216 located outside the battery compartment 213. The battery package monitor 216 can be held by a holder 211 of the battery thermal management package 210, such as a battery monitor pocket joined to the external wall of the battery thermal management package.

Some embodiments of the present disclosure can include an over-pressure vent. In the FIG. 2 embodiment, the battery thermal management package 210 includes an over-pressure vent 250. The over-pressure vent 250 can relieves excess pressure within the battery compartment 213 to prevent it from rupturing or exploding. The over-pressure vent can include a valve, baffle, partial closure, pathway or disc that opens in response to pressure within the battery compartment exceeding a predetermined level. That is, in response to pressure within the battery compartment rising to a level that is above a set point of the over-pressure vent, the valve or disc opens, allowing excess pressure to escape from the battery compartment. This helps to prevent the battery compartment from becoming over-pressurized. There are many different types of suitable over-pressure vents, including pressure relief valves, rupture discs, and explosion vents. The type of over-pressure vent can vary depending on the embodiment and a variety of factors such as pressure rating, nature of the fluid or gas being contained, and potential consequences of the venting.

Some embodiments can track the pressure level and/or pressure level rate of change within the battery compartment 213. In response to an over-pressure event (or precursor over-pressure event), the battery package monitor can alert the user (e.g., via smartphone or remote monitor interface) to a gas event that indicates the package has or is going to outgas in a way that can expose the user to potential harm if not careful. The pressure levels can be utilized to monitor the life of the filter(s) for readiness and end of life.

Some embodiments of the present disclosure can include a gas mitigation system 220 separate from the battery thermal event package 210. The gas mitigation system can be disposed within an area where one or more batteries are located. For example, a gas mitigation system can be located within a cargo compartment of a vehicle, such as a truck, where multiple batteries (each having their own battery thermal event package) are being stored during transportation. This separate gas mitigation system 220 can provide an additional layer of battery event monitoring and protection for multiple batteries. The gas mitigation system 220 can filter or outgas from the cargo area of the vehicle before the cargo compartment of the vehicle is opened. Further, alerts and indicators may communicate safety and evacuation level information to remote devices located outside the battery storage area. The alerts and indicators can be communicated to a remote monitor interface 222 (e.g., a vehicle monitor interface installed in the cabin of the vehicle or a smartphone) outside of the cargo compartment of the vehicle.

The gas mitigation system 220 can include a variety of different components that provide communication and control functionality to sense and mitigate gas within the general vicinity of the gas mitigation system. As depicted in FIG. 2, the gas mitigation system 220 can include a communication interface 272, one or more gas sensors 274, a controller 276, a battery 278 (or other power source), a fan 280, and a filter 282.

The communication interface can communicate with other devices via a wireless or direct wired link. For example, in one embodiment, the communication interface enables communication with the communication interfaces 230 of one or more battery package monitors 216 over Bluetooth and/or WiFi. In addition or alternatively, the gas mitigation system 220 communication interface 272 can be configured to communicate with batteries 212 and/or sensor packs 214.

Essentially any suitable gas sensor can be utilized in the sensor pack 14, 214 and the gas mitigation system 220. Multiple different kinds of gas sensors can be included in either or both of the sensor pack 14, 214 and the gas mitigation system 220. For example, one or more separate gas sensors can be provided in the gas mitigation system including a carbon dioxide sensor, hydrogen sensor, carbon monoxide sensor, and a hydrogen fluoride sensor, to name a few examples. The particular sensors in the sensor pack can be configured and calibrated based on the batteries being monitored.

Figure 6:
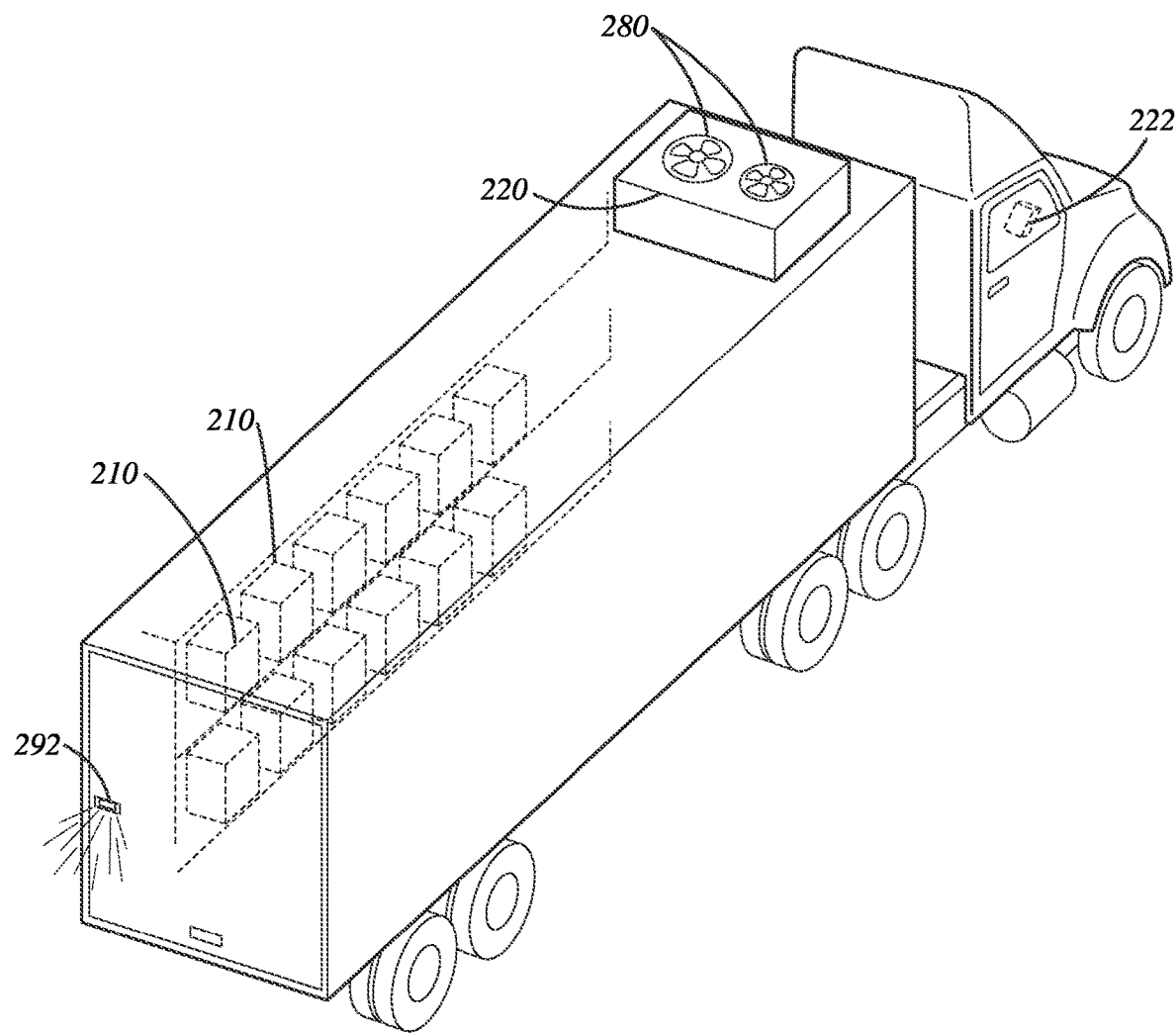
FIG. 6 illustrates a representative view of a battery event monitoring system of the present disclosure installed within a vehicle.

Referring to FIG. 6, one embodiment of several battery thermal management packages being transported in a truck is depicted where the truck has a gas mitigation system 220. The gas mitigation system 220 can include a controller that reacts to received communication from the communication interface 272 and/or sensor feedback from the gas sensor(s) 274. The controller can control the fan 280 to assist with outgassing. For example, if a thermal event is detected (e.g., over threshold amounts of certain gas detected) or communicated (e.g., an alert communication from a battery package monitor communication interface 230), the controller 276 can turn on or adjust the speed of the fan in order to begin or accelerate outgassing. The controller 276 can also communicate to a remote monitor interface 222 (e.g., a cell phone in the passenger compartment of the truck or a dedicated monitor installed in the truck) and/or illuminate a warning light 292 installed on the outside of the truck to act as a warning that there is an issue with one or more batteries inside the truck. The controller can also track filter life to ensure it can be replaced at the appropriate time. In one embodiment the filter 282 is configured to filter out hydrogen fluoride and can be refreshed by replacing a hydrogen fluoride filter cartridge in the filter 282. The gas mitigation system 220 can operate on a separate power supply, such as a battery 278. In addition, or alternatively, the gas mitigation system 220 can be connected to a vehicle power supply 290.

The gas mitigation system 220 can communicate with a remote monitor interface 222 For example, the gas mitigation system 220 can communication information regarding safety, filter life and filter readiness to a remote monitor interface, such as a vehicle monitor interface installed in the cabin of the vehicle or to a user's smartphone. The communication can be routed through the same communication interface 272 utilized for communicating with the battery package monitor or a separate communication channel. The gas mitigation system 220 can also optionally include a local monitor interface. In some embodiments, the local monitor interface can be viewed through a glass or other transparent panel.

Some embodiments of the battery event monitoring system for a thermal managed battery in accordance with the present disclosure can provide tracking and filtering outgassing of battery thermal events in a controlled package. The system (e.g., the gas mitigation system 220 and/or battery package monitor 16) can track a variety of sensor outputs (e.g., concentration levels of specific gases, pressure levels, temperature level within/outside the battery compartment, enclosure volume, estimated volume, accumulated event volume, to name a few). Combinations of various sensor outputs can be organized into specifically tracked battery events. For example, a combination of a shock event (e.g., accelerometer threshold movement) and high ambient temperature may be a pre-cursor of a thermal event. A particular battery event may be contingent on certain pre-cursor events because the system recognizes that certain combinations of sensor outputs mean that a battery has increased sensitivity to a particular chain of events.

The battery thermal management package can include one or more filters to filter gas from the battery (e.g., hydrogen fluoride gas generated in a thermal event for lithium-ion batteries). After a thermal event that involves release of such gasses, the battery chemistries, e.g., if the gas is caustic, may require a change in filter media based on the outgas sing chemistry. This can be tracked and monitored by the system at setup. A filter can be designed for a specific volume and concentration of chemical. By knowing the battery type and event volume/pressure the system can calculate the event volume in a way that provides filter life and replacement indicators. The system can track an event and prompt a user (e.g., via a battery monitor interface) to attend to filter change and sensor pack changes after each event (if necessary) assuring safety during transportation of one or more batteries. This can include end-of-life tracking for filters and sensor packs as well as the overall battery thermal management package(s). The various events and actions can be recorded and reviewed at the start of (and/or during) a new transportation event. Each event and actions can have an associated identifier (ID) and may be RFID or other such identification technology to assure compatibility and proper operational safety. The RFID can be written to for each event and that volume of each event as to store the capacity and events within the filter. This way when a filter has reached end-of-life the monitor can indicate the need to replace that filter.

Some embodiments of the battery event monitoring system for a thermal managed battery in accordance with the present disclosure can track filter life and package life based on event characteristics, such as event intensity. The battery event monitoring system can monitor characteristics of the battery events. For example, both pressure event intensity and thermal event intensity can be tracked. The intensity of these events can impact package life, filter life and sensor pack life. The system can tracks and age (e.g., with reference to replacement/repair timing) these components (e.g., package, filter(s), and sensor pack) proportionally to the intensity of tracked battery events (e.g., pressure event intensity and thermal event intensity). The proportional aging for each component can vary depending on the type and severity of the intensity. That is, in some embodiments, the package, filter, and sensor pack can be aged differently depending on the type of battery events and their intensities. For example, filter life depends heavily on pressure events and the intensity thereof. Intensity within this context refers to a combination of the sensor value and the duration. To continue with a more specific example, a relatively low elevated pressure (e.g., 30-40 PSI) even over a prolonged duration (3-4 minutes) may have a relatively low intensity (corresponding to a lower proportionality constant multiplier), while a relatively high elevated pressure (e.g., 70-75 PSI) even for a short duration (5-6 seconds) may have a relatively high intensity (corresponding to a much higher proportionality constant multiplier). Put simply, filter life depends generally on pressure intensity events that account for both the pressure value and the duration of that pressure on the filter. The battery package monitor 16 (or other controller in the system) can use the event information (e.g., pressure intensity and corresponding proportionality constant multiplier) to calculate a volume of gas passing through the filters against the filter rating and inform decisions about filter life and filter media replacement.

Some embodiments of the battery event monitoring system for a thermal managed battery in accordance with the present disclosure can monitor and alert battery thermal events during transportation of one or more thermal managed batteries (e.g., batteries enclosed within thermal managed packages). The system can communicate from the battery package monitor to a remote monitor interface (e.g., located in the cabin of the vehicle transporting the battery or located at a transportation facility) to inform the driver or transportation facilitator(s) of an event so that they are aware of the situation and when it is completed so they can additionally monitor the situation. For example, depending on the battery information communicated by the package monitor, a driver may check gas levels before opening the vehicle cargo area or evacuate the vehicle promptly.

In some cases, it may be suitable to execute an evacuation procedure due to a battery thermal event. That is, part of a monitoring a thermal event can include evacuating the immediate area of the battery thermal managed package and interfacing the battery package monitor in the transportation vehicle remotely. A gas mitigation system, or other system, can provide ventilation, fire protection and chemical monitoring. That is, a separate system can be included in some vehicles that can interface the packages being transported and react accordingly (e.g., by interfacing the battery package monitor and taking action based on sensor data received from one or more battery thermal managed packages). The driver, pilot, or transportation facilitator can manage the events remotely by communication with the gas mitigation system, one or more of the battery package monitor, or a combination. Because battery identifiers are part of setup, the system can track which battery (or batteries) are experiencing a thermal event. In some embodiments, the battery identifier information can be tied to battery location within a cargo area of a vehicle or a storage area of a storage facility. This location data combined with the thermal event data can assist with providing safe clean-up of the aftermath of any battery thermal events. Further, identifier tracking allows a larger view of fleet and global tracking of battery events as the data is pushed up to the cloud (e.g., via satellite or mobile communications). For example, a battery package monitor in accordance with the present disclosure can include a satellite, cellular, or other cloud connections for communicating battery information. Alternatively, or in addition, the battery package monitor can communicate with other devices that have satellite, cellular, or other cloud connections for communicating such battery information.

A specific transportation monitor interface can be provided to assist with fire protection and evacuation management. For example, a gas mitigation system installed in the cargo area of a vehicle where one or more batteries are being transported can be provided and a transportation monitor interface in the cabin of a vehicle can interface with the gas mitigation system and/or the individual battery thermal managed packages being transported. The gas mitigation system and/or any individual battery package monitors can communicate evacuation instructions (along with other battery information) to the transportation monitor interface in the cabin of the vehicle. Further, a separate filter and fan system may be provided within the transportation compartment that can interface to the gas mitigation system and/or the individual battery package monitors.

Some embodiments of the present disclosure can provide a mobile device application for vehicle drivers. The mobile device application can provide a portal for guiding setup of the system. The application can also provide online updates and programming. It can also provide a link to a cloud portal or hub that can be used to administer a fleet of battery transportation vehicles remotely. Each of the battery package monitors can include a chip or circuit with a unique identifier. The identifier can assure security in data transfer and OTA (over-the-air) programming. This allows updates to profiles, safety and filter change data and event monitoring through existing cellular devices. The events can be linked to the person traveling with the tracking device and package.

By adding additional layers of data curves and connectivity the system can better track the trajectory and rate of the battery event and safety support system and status. Further, by collecting battery data and storing it in the cloud, machine learning analysis can be utilized to provide additional insights. By simplifying the learning and configuration of the monitoring system it can learn and evolve using over the air programming for configuration and use case analysis. As the system gets more events logged, the system can learn from the anomalies and look deeper at these specifics, the more data the better the system gets at predicting when an event will occur for a specific battery type/pack over specific events.

Ultimately, the present disclosure enables an easier to install, more reliable solution with a more positive outcome. Some embodiments of the present invention relate to detection of usage and installation. Some known problems of the past technologies relate to the understanding of basic consumption data. The addition of communications, learning and configuration along with cloud analysis make the over the air solutions adaptable and a powerful tool.

Some embodiments of the battery event monitoring system for a thermal managed battery in accordance with the present disclosure can conduct event profiling. Event profiling can enhance transportation package design. Because the battery package monitor can track and monitor a variety of different battery related events across numerous different transportation scenarios, a large amount of battery information can be collected and stored in a database. This battery information database can enable optimizations in both safety and configurations by using profiles for each specific manufacturer and battery type. The profiles allow an offset for the various manufacturers and battery types. An example may be to select a route that limits the vibration to specific levels or prevents transportation through a desert during the daytime to limit ambient temperatures.

Related events can be profiled and can be used to create programmable training to recognize each type and size of event. Once the system is programmed and configured it can monitor and track the conditions, events, and triggers over time.

The battery information can also be used to qualify battery transportation events within that package. For example, ambient temperature, accelerometer data, and gas data can be used to understand what the transportation process looked like. An event in one pack may affect others by elevated temperature alone. This can assist in better logistics planning.

The battery information can also be connected to a user profile. As we gather more data on specific batteries this will further impact logistics and event probabilities. Loading and transportation densities can be calculated on this basis.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A battery event tracker and management system, the system comprising:
   a rechargeable battery;
   a battery thermal management package having a battery compartment configured to contain a thermal runaway event of the rechargeable battery, wherein the battery thermal management package includes a holder joined to a surface of the battery thermal management package outside the battery compartment of the battery thermal management package, wherein the holder is configured to hold a battery package monitor outside of the battery compartment of the battery thermal management package;
   a battery package monitor selectively removable from the holder of the battery thermal management package; and
   a sensor pack contained within the battery compartment of the battery thermal management package with the rechargeable battery and configured to:
   sense one or more battery characteristics while the rechargeable battery is contained within the battery compartment of the battery thermal management package; and
   communicate the one or more battery characteristics to a battery package monitor held outside of the battery compartment of the battery thermal management package by the battery thermal management package holder.

2. The battery event tracker and management system of claim 1 wherein the sensor pack is configured to sense a battery gas leak from the rechargeable battery within the battery compartment of the battery thermal management package.

3. The battery event tracker and management system of claim 1 wherein the sensor pack is configured to sense pressure within the battery compartment of the battery thermal management package.

4. The battery event tracker and management system of claim 1 wherein the sensor pack is configured to sense temperature within the battery compartment of the battery thermal management package.

5. The battery event tracker and management system of claim 1 wherein the battery package monitor is configured for wireless communication with the sensor pack within the battery compartment through the battery compartment of the battery thermal management package.

6. The battery event tracker and management system of claim 1 wherein the battery package monitor is configured for direct communication with the sensor pack through a sealed pin-through hole in the battery compartment of the battery thermal management package.

7. The battery event tracker and management system of claim 1 wherein the rechargeable battery is at least one of a lithium-ion (Li-ion) battery, a nickel-cadmium (NiCad) battery, and a nickel-metal hydride (NiMH) battery.

8. The battery event tracker and management system of claim 1 including a remote monitor interface in communication with the battery package monitor held in the holder of the battery thermal management package.

9. The battery event tracker and management system of claim 8 wherein the remote monitor interface is a smartphone and wherein the battery thermal management system is disposed within an enclosed cargo area of the vehicle, wherein the smartphone is configured to provide an alarm based on information from the battery package monitor.

10. The battery event tracker and management system of claim 8 wherein the remote monitor interface is configured to provide filter life and readiness information based on information from the battery package monitor.

11. The battery event tracker and management system of claim 8 wherein the remote monitor interface is a vehicle monitor interface disposed within a cabin area of a vehicle and wherein the battery thermal management system is disposed within an enclosed cargo area of the vehicle separate from the cabin area of the vehicle, wherein the vehicle monitor interface includes an environmental safety indicator configured to indicate environmental safety status within the enclosed cargo area based on information from the battery package monitor.

12. The battery event tracker and management system of claim 11 wherein the vehicle monitor interface includes a battery, a gas sensor, a fan controller, a fan, a filtration system, and a communication interface.

13. The battery event tracker and management system of claim 12, wherein vehicle power is connected to the vehicle monitor interface battery.

14. The battery event tracker and management of system of claim 1 wherein the battery package monitor is configured to sense a thermal runaway precursor event and communicate an alert to a remote device.

15. The battery event tracker and management of system of claim 1 wherein the battery thermal management package includes a tortured path from the battery compartment to a gas outlet.

16. The battery event tracker and management of system of claim 15 wherein the battery package includes a filter at the outlet of the battery thermal management package.

\* \* \* \* \*